United States Patent [19]

Uken

[11] Patent Number: 4,485,878
[45] Date of Patent: Dec. 4, 1984

[54] SHIELD UNIT FOR CULTIVATORS

[76] Inventor: Harvey J. Uken, Rte. 2, Box 195, Lake Lillian, Minn. 56253

[21] Appl. No.: 431,023

[22] Filed: Sep. 30, 1982

[51] Int. Cl.³ .............................................. A01B 39/26
[52] U.S. Cl. ..................... 172/510; 172/156
[58] Field of Search ............... 172/156, 508, 510, 142, 172/509, 513, 182, 155, 193, 194, 192

[56] References Cited

U.S. PATENT DOCUMENTS

| | | | |
|---|---|---|---|
| 824,961 | 7/1906 | Teeter | 172/510 |
| 975,326 | 11/1910 | Byrd | 172/510 |
| 1,376,910 | 5/1921 | Wright | 172/510 |
| 1,453,891 | 5/1923 | Sivley | 172/510 X |
| 1,695,512 | 12/1928 | Sturrock | 172/156 |
| 2,677,339 | 5/1954 | Armstrong | 172/156 X |
| 2,762,287 | 9/1956 | Grieman | 172/510 |
| 3,429,379 | 2/1969 | Tebben | 172/510 |
| 3,526,281 | 9/1970 | Meaden | 172/510 |
| 3,719,234 | 3/1973 | Neece | 172/512 |
| 4,424,869 | 1/1984 | Braucke | 172/548 |

FOREIGN PATENT DOCUMENTS 70417 10/1927 Sweden .................. 172/142

Primary Examiner—Richard J. Johnson
Attorney, Agent, or Firm—Stuart R. Peterson

[57] ABSTRACT

A duplicate shield mechanism or unit is employed for each rearmost sweep of a cultivator. The unit in each instance includes two laterally adjustable disks mounted for rotation at the trailing end of a longitudinally adjustable two-piece drawbar or arm. The forward end of each drawbar or arm is pivotally attached to a selected portion of the rear shank having the sweep with which the unit is to co-act. Both disks of each unit travel between the rows of plants rather than over the row.

12 Claims, 4 Drawing Figures

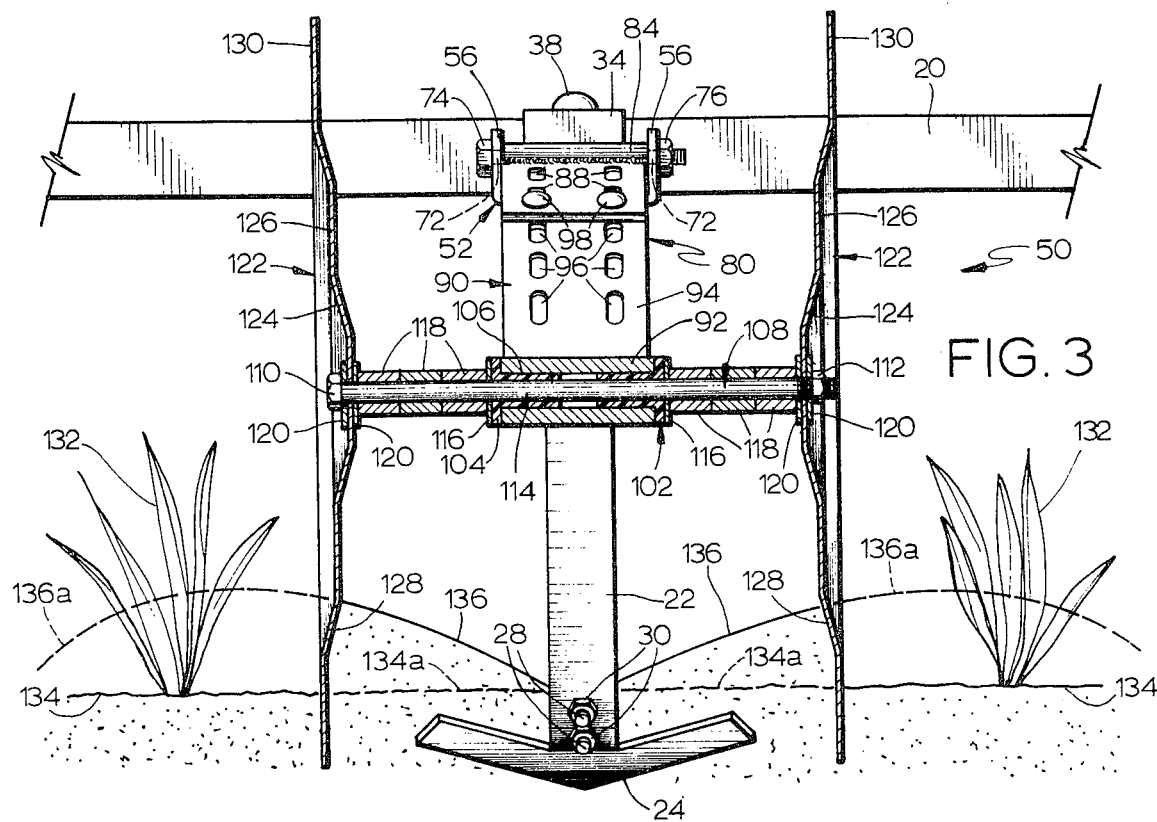
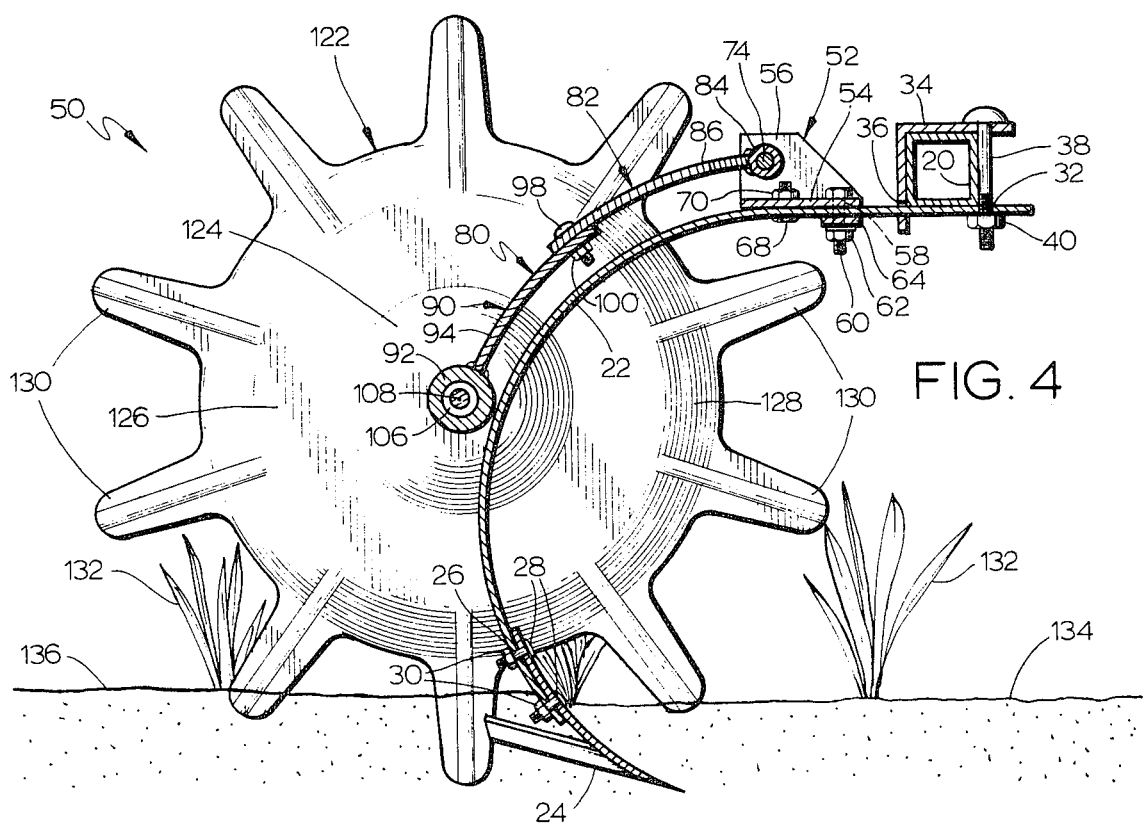

SHIELD UNIT FOR CULTIVATORS

BACKGROUND OF THE INVENTION

1. Field of the Invention

This invention relates to row crop cultivation, and pertains more particularly to a shield mechanism or unit comprised of a pair of laterally spaced disks that travel between adjacent rows of plants and at the opposite sides of the path traversed by the rearmost cultivator sweep.

2. Description of the Prior Art

Cultivator shields, of course, are old and well known. In the past, it has been a continuing problem with respect to the back cultivator sweeps throwing too much soil onto the plants, the amount depending on the cultivator speed. A cultivator shield exemplifying the type of shield known to me is illustrated in U.S. Pat. No. 3,429,379, issued on Feb. 25, 1969 to John A. Tebben for "CULTIVATOR SHIELD".

SUMMARY OF THE INVENTION

My invention has for a general object the faster cultivation of row-type crops. In this regard, it has heretofore been a problem that when the cultivator is pulled rapidly over the field to be worked, the rearmost sweeps have thrown entirely too much dirt onto the plants. Where the plants are quite small and immature, it follows that the fragile plants can be seriously damaged and their growth thwarted by reason of the excess soil that has in the past covered the plants when the cultivator is pulled at a high rate of speed when using the customary type of cultivator shield.

Another object of the invention is to retain the loose dirt in the row so that it acts as a mulch and thus conserves moisture. In this regard, it is an aim of the invention to minimize the forming of hard-packed soil and the accompanying cracking that have been previously experienced when using conventional cultivator shields, the crust-like surface not allowing adequate moisture penetration.

Yet another object of the invention is to provide a cultivator shield in the form of a unit that levels the ground between the two disks of which each shield unit is comprised. The level ground enables such crops as soy beans to be cut shorter when harvesting. The level ground also facilitates walking between the rows of plants, particularly when the crop is of the bean variety.

A further object is to provide a shield unit for cultivators that can be adjusted for both wide and narrow rows of plants. For instance, soy beans may very well be planted with a twelve inch row width, whereas corn is usually planted with a much greater row width, on the order of thirty inches, but sometimes the width is as much as thirty-eight inches or as little as twenty inches. Thus, it is within the purview of my invention to adjust the spacing between the rotary disks so as to adjust for whatever present day row width that is likely to be encountered.

Still another object of the invention is to adjust the disks, which perform the shielding action, in a fore and aft direction relative to the shank, and more importantly with respect to the sweep at the lower end thereof, so that an optimum shielding action can be obtained for such factors as the particular row width, the cultivation speed, and/or the size and type of sweep.

My invention also has as an additional object the advantage of being able to attach the unit directly to a selected portion of the shank. In this regard, it is contemplated that a simple clamping arrangement be utilized which enables the unit to be quickly attached and aligned with the particular shank to which it is fastened.

Briefly, my invention envisages a plurality of identical shield units, one for each rearmost cultivator shank. Provision is made for pivotally attaching each unit to the shank having the sweep with which it is to be associated. When detachably fastened to a selected portion of the shank, the two laterally spaced rotary disks move between adjacent rows of plants, confining the stirred soil so that the soil does not flow onto the adjacent plants, resulting in a relatively level and flat surface after the shield unit has passed a given cultivation point. By means of tubular spacers, the distance between the disks can be adjusted for the particular spacing between the plant rows. Additionally, the drawbar or arm on which the disks are rotatably mounted can be lengthened or shortened, thereby permitting the disks to be positioned forwardly or rearwardly relative to the sweep so that the best possible shielding action is realized.

BRIEF DESCRIPTION OF THE DRAWINGS

FIG. 3 is a vertical sectional view taken in the direction of line 3—3 of FIG. 2, and FIG. 4 is a sectional view taken in the direction of line 4—4 of FIG. 2.

DESCRIPTION OF THE PREFERRED EMBODIMENT

Figure 1:
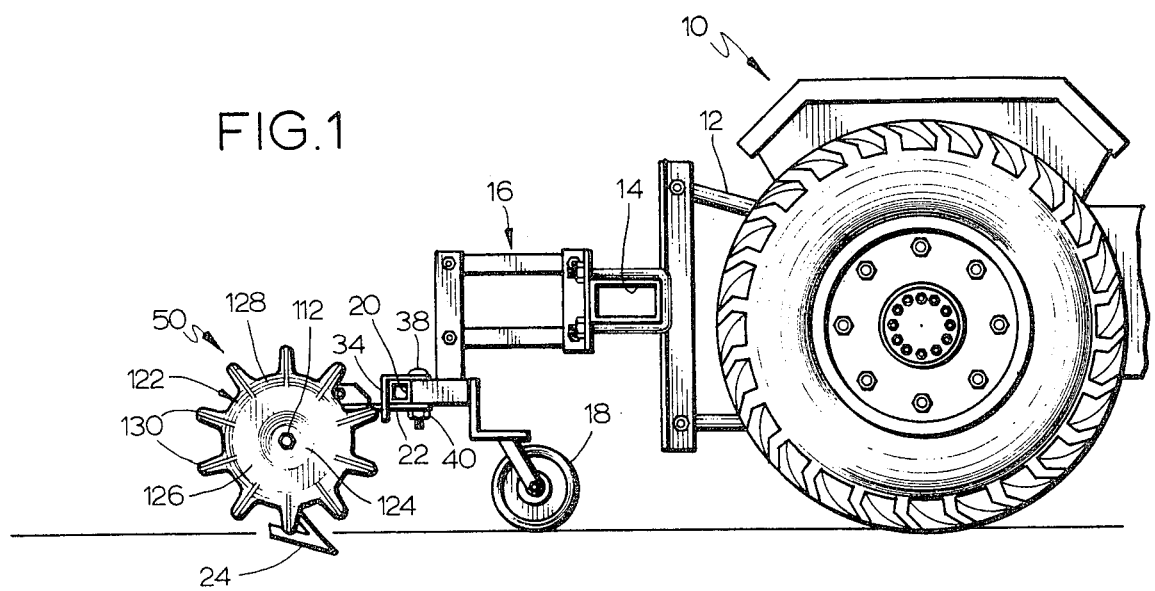
FIG. 1 is a side elevational view of one shield unit exemplifying my invention, the unit being attached to one of the shanks at the rear of a conventional tractor.

It is not necessary to show a complete tractor; therefore, only a rear portion of a tractor 10 has been depicted in FIG. 1. It will be observed that the tractor 10 is equipped with a hitch 12, the details of which are not important to a practicing of my invention. There is a cross beam 14 extending laterally behind the tractor and in this instance fixedly attached to the hitch 12. To the cross beam 14 is mounted a tool frame 16, there being one such frame 16 for each cultivator shank and sweep. Beneath two of the frames 16 are tool frame support wheels, one of which appears in FIG. 1. Additionally, a tool bar 20 is included.

Also conventional is a typical shank 22 having a shovel or sweep 24 at the lower end thereof. The lower end portion of the shank 22 has two holes 26 through which bolts 28 extend; nuts 30 on the bolts 28 secure that sweep 24 to the shank 22. At the upper end of the shank 22 is an L-shaped bracket 34 having a transverse slot 36 through which the shank 22 extends. By means of a bolt 38 and a nut 40, it will be appreciated that the upper end of the shank 22 is secured to the tool bar 20.

It will be appreciated that cultivators are usually comprised of gangs of shanks 22, each having a shovel or sweep 24 at its lower end. The number of gangs depends upon the number of rows of plants to be cultivated at any one time. When a gang consists of more than one shank, the shanks are arranged at an angle with respect to the path of travel, the rearmost shanks being more closely adjacent the plants than the forwardmost shanks. Thus, my invention is intended to be used behind the rear shank to collect and stop the dirt that would otherwise fly out and cover the row crop. However, since my invention is suitable for cultivators utilizing a single shank and sweep to form a furrow between adjacent rows of plants, the drawings can be simplified appreciably by illustrating the invention in conjunction with shanks 22 that are merely spaced laterally along the tool bar 20, there being in the pictured instance just one such shank 22 that is to stir the soil between the rows of plants. In other words, there would be only a single row of shanks 22 in the illustrated situation.

Figure 2:
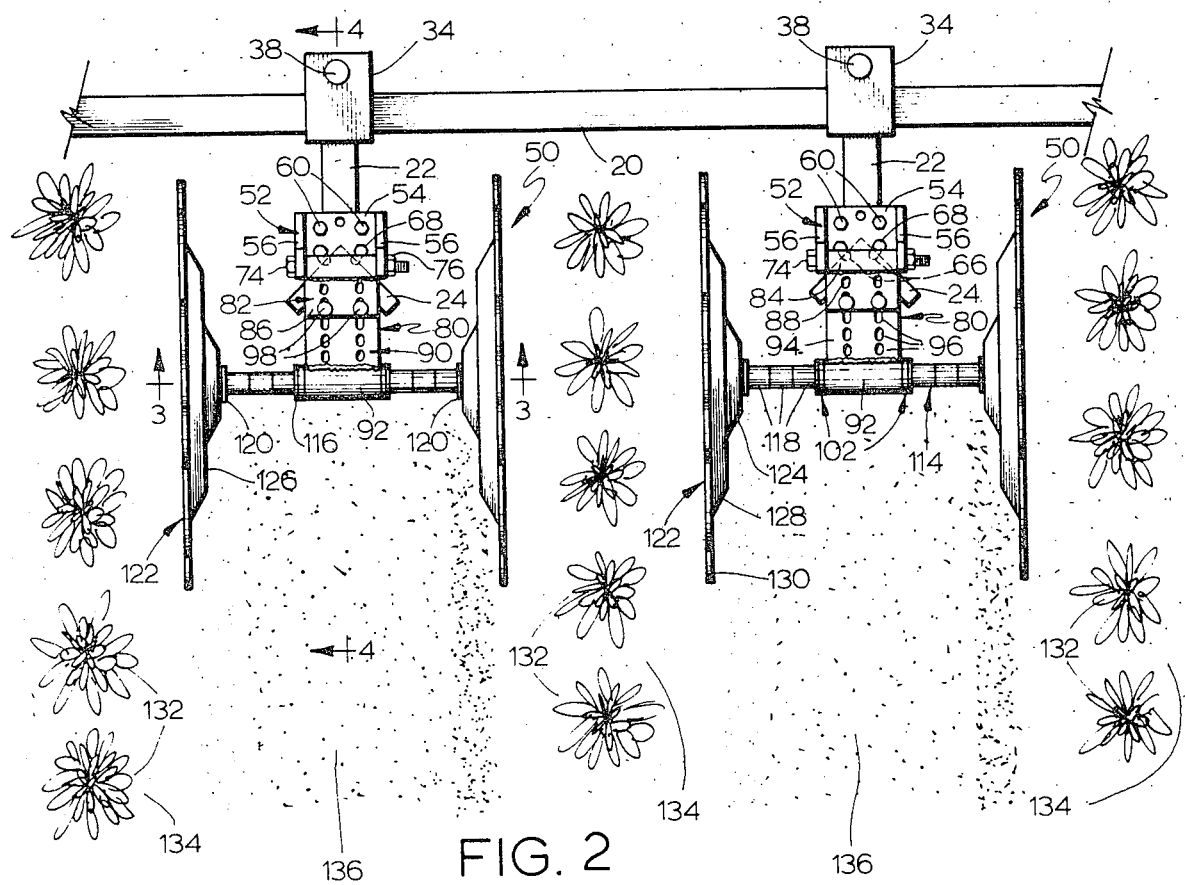
FIG. 2 is a plan view looking down on two of my shield units.

With the above in mind, two shield units or mechanisms 50 have been illustrated. Of course, from the above information it will be appreciated that any number of such mechanisms 50 would be attached to the tool bar 20, depending upon the number of rows to be cultivated. Each unit 50 comprises a U-shaped mounting bracket 52 having a web portion 54 and leg or side portions 56. There are two laterally spaced holes 58 in the web 54, one of which has been indicated in dotted outline in FIG. 4. Also in FIG. 4 is shown one of the two bolts 60 that extend downwardly through the holes 58; FIG. 2 depicts both bolts 60. The bolts 60 have nuts 62 thereon, as can be perceived from FIG. 4.

Not only do the bolts 60 extend downwardly through the web 54 of the bracket 52, but they extend downwardly through a transverse clamping strip 64. In this way, the bracket 52 can be securely clamped to a selected portion of the shank 22 simply by tightening the nuts 62 on the bolts 60. Additionally, the web 54 of the bracket 52 has a pair of angled slots 66, there being bolts 68 in the slots 66 having nuts 70 thereon. The heads of the bolts 68 bear against the sides of the shank 22, thereby assisting in maintaining the shield unit 50 in proper alignment with the shank 22. It should be borne in mind, however, that the bracket 52 is clamped to the shank 22, and not to the tool bar 20.

The side or leg portions 56 of the bracket 52 have holes 72 therein, there being one such hole 72 in each side portion 56. In this way, a bolt 74, which functions as a pin or shaft, can be inserted through the holes 72. A nut 76 on the bolt 74 retains the bolt in place with respect to the leg or side portions 56. As already indicated, the bolt 74 serves as a pin or shaft for a purpose presently to be explained.

At this time, attention is directed to a two-piece drawbar or arm indicated generally by the reference numeral 80. The first piece or member has been identified by the reference numeral 82 and is comprised of a tubular sleeve or bearing 84 that is fixedly secured, as by welding, to a curved plate 86. The curved plate has a number of parallel slots 88 therein. The other piece or member of the two-piece arm 80 has been labeled 90 and includes a tubular sleeve or bearing 92 having a curved plate 94 welded thereto. In this instance, the plate 94 has parallel slots 96 therein which are registerable with the slots 88 in the curved plate 86. It is by reason of bolts 98 that extend through the slots 88 and 96, when aligned with each other, and nuts 100 that releasably hold the two pieces or members 82 and 90 in a fixed, yet longitudinally adjustable, relationship with each other.

As best seen in FIG. 3, each unit 50 utilizes plastic bushings or bearings 102, such as nylon, there being two such bushings shown in FIG. 3. Each bushing 102 has an integral flange 104 and a sleeve portion 106. A bolt 108, forming a transverse shaft, has a head 110 and a nut 112 threadedly attached to the opposite end thereof. It is actually the cylindrical shank portion labeled 114 residing between the head 110 and the nut 112 that serves as the shaft which rotates within the nylon bushings or bearings 102. As can be seen from FIG. 3, there is a washer 116 bearing against the flange 104 of each bushing 102. It is important to observe that a plurality of tubular spacers 118 encircle the shank 114 of the shaft or bolt 108. In a moment the reason for the tubular spacers 118, and the fact that any or all of them can be removed will become manifest.

There are two washers 120 on each side of a pair of laterally spaced disks 122. It will be seen that each disk 122 includes an inner inclined annular recess portion 124, this recess portion 124 having a centrally disposed hole therein through which the shank 114 of the shaft or bolt 108 extends. Immediately outwardly of the inclined recessed portion 124 is an integral intermediate annular portion 126 that is flat, residing in a vertical plane. Outwardly of the annular portion 126 is still another integral portion, this being an inclined annular portion labeled 128. Integral with the periphery of the outer annular portion 128 are any number of radially projecting teeth 130 that assure that the disks 122 will rotate as the tractor 10 advances across the field to be cultivated. From FIG. 3, it will be understood that the portions 124, 126 and 128 impart outwardly facing concave appearances to the disks 122. The farmer has a choice, however, as far as reversing the disks so that the concave configuration faces inwardly, the dirt being then thrown more inwardly. As shown, though, the peripheries of the disks 122 are located farther from the sweep 24, which is usually an advantage when a rigid shank 22 is used, for otherwise the peripheries would in some cases be too close to the sweep 24.

Six and twelve row cultivators are quite common. However, my invention is susceptible to incorporation with any type of cultivator. It is very important to appreciate, though, that the two disks 22 which are incorporated into each shield unit 50 pass between adjacent rows. This is believed evident from the information portrayed in FIGS. 2 and 3. Thus, instead of straddling a given row of plants, the various rows being identified by the reference numeral 132, there are disks 122 laterally spaced between the adjacent rows. It is believed that this is best illustrated and understood from FIG. 2.

The soil in which the plants grow, and it must be kept in mind that they are arranged in rows 132, has been given the reference numeral 134. Needless to say the function of the shanks 22, more specifically the sweeps 24 attached to their lower ends, is to stir the soil in a V-shaped or snowplow-like manner so as to prevent the unwanted growth of weeds. However, without the disks 122, it can be seen that the furrow created by the sweep 24 would result in soil being thrown against the plants 132 as indicated by the broken lines 136a. The condition indicated by the broken lines 136a, of course, does not occur when using my shield unit 50. With the disks 122, however, the soil is retained between the disks 122, producing what might best be termed a V-shaped groove as indicated by the sloping solid lines 136. After the unit 50 has moved on, then the mounds beneath the solid lines 136 come back in to fill the groove. The flat or level surface than when results is for all intents and purposes even with the ground line 134 and has been denoted by the broken horizontal line 134a.

As herein earlier mentioned, several distinct advantages stem or flow from the building up of the soil 136 between the disks 122. In this regard, the moisture is better retained in the soil, it is easier to walk on a flat surface, and the harvesting of a crop is facilitated. This is realized by having each unit or mechanism 50 provided with two disks 122. Thus, while the sweep 24 creates a centrally located furrow as can be understood from FIG. 3, the disks 122 traverse a path not only to either side of the sweep 24 but between the adjacent rows of plants 132.

Whereas FIGS. 2 and 3 represent a relatively wide row spacing, it can be appreciated that by taking out one or more of the tubular spacers 118 that the disks 122 can be more closely spaced with respect to each other, thereby permitting both of the disks to still pass between adjacent rows. A further decrease in disk spacing can be realized by reversing the disks so that the concave side now facing outwardly faces inwardly.

Also, from FIG. 4, it should be apparent that the two-piece drawbar or arm 80 can be adjusted by reason of the pieces 82 and 90 being shifted relative to each other. Removal of the bolts 98 from the slots 96 and repositioning them in different slots 96 will enable the farmer to adjust the unit 50 in the direction of cultivation travel so as to best prevent an objectionable amount of dirt from being thrown onto the plants 132.

Once again it should be stressed that one unit 50 is used in conjunction with each rear shank 22 of a cultivator. Without any forward shanks being present, the various shanks 22 (only two appearing in FIG. 2 and one in FIGS. 3 and 4) are the rear ones and should suffice to illustrate the benefits to be derived from a practicing of my invention.

I claim:

1. A shield unit for row crop cultivation comprising a pair of laterally spaced disks, curved arm means, a shaft adjacent one end of said arm means having portions projecting in opposite lateral directions from said arm means, one of said disks being rotatably carried on one of said laterally projecting portions of said shaft and the other of said disks being rotatably carried on the other of said laterally projecting portions of said shaft so as to mount said disks for rotation in parallel planes about an axis perpendicular to said arm means, and means adjacent the other end of said arm means for pivotally attaching the other end of said arm means to a cultivator shank having a sweep at its lower end, whereby when said sweep is cultivating a strip of soil between two crop rows, said disks travel between said rows and at both sides of the path traversed by said sweep.

2. A shield unit in accordance with claim 1 including a tubular bearing at said one end of said arm means, said shaft extending through said tubular bearing, and means for maintaining said disks in a predetermined laterally spaced relation on said shaft.

3. A shield unit in accordance with claim 2 in which said means for maintaining said disks in their said predetermined laterally spaced relation includes at least one tubular space between each of said disks and said tubular bearing.

4. In combination with a pair of curved cultivator shanks which are attached at their upper ends to a horizontal tool bar, a shield unit attached to each of said shanks, each unit comprising a pair of disks, a curved drawbar having a curvature corresponding generally to that of the shank with which it is associated, means rotatably mounting said disks at the lower end of said drawbar in a laterally spaced relation, and means at the upper end of said drawbar for pivotally attaching said drawbar to a selected portion between the upper and lower ends of the shank with which it is associated, said drawbar having a sufficiently shorter length than the length of the shank with which it is associated so that said disks are in general lateral alignment with the sweep residing therebetween, whereby when said shanks traverse parallel paths between adjacent rows of plants, the disks of each unit pass between two rows of plants and along paths to either side of said shanks so that the soil furrowed by the sweep on said shanks is substantially prevented from spreading onto said plants, being instead confined to a region between the disks of each of said shielding units.

5. The combination of claim 4 in which the mounting means of each unit includes a tubular bearing affixed to said one end of said drawbar, a shaft journaled in said tubular bearing and having end portions projecting from the opposite ends of said tubular bearing, said disks being mounted on the projecting end portions of said shaft, and means carried on the projecting end portions of said shaft for determining said laterally spaced relation between said disks.

6. A shield unit for row crop cultivation comprising a pair of laterally spaced disks, arm means, means adjacent one end of said arm means mounting said disks for rotation about an axis perpendicular to said arm means, and means adjacent the other end of said arm means for pivotally attaching the other end of said arm means to a cultivator shank having a sweep at its lower end, said attaching means including a tubular bearing fixedly secured to said other end of said arm means, a U-shaped bracket and a shaft extending through said tubular bearing and the sides of said bracket, whereby when said sweep is cultivating a strip of soil between two crop rows, said disks travel between said rows and at both sides of the path traversed by said sweep.

7. A shield unit in accordance with claim 6 in which said attaching means further includes a transverse strip and a pair of bolts extending through said transverse strip and said bracket to clamp said bracket to a selected portion of the cultivator shank.

8. A shield unit for row crop cultivation comprising a pair of laterally spaced disks, arm means including first and second curved plates, each plate having formed therein a plurality of slots, bolt means extending through registered slots of both of said curved plates to retain adjacent end portions of said curved plates in an overlapping relation, means adjacent one end of said arm means mounting said disks for rotation about an axis perpendicular to said arm means, and means adjacent the other end of said arm means for pivotally attaching the other end of said arm means to a cultivator shank having a sweep at its lower end, whereby when said sweep is cultivating a strip of soil between two crop rows, said disks travel between said rows and at both sides of the path traversed by said sweep.

9. A shield unit in accordance with claim 8 in which each of said curved plates has a tubular bearing secured to its other end, a first shaft journaled in the tubular bearing of said first plate, the tubular bearing on said first plate and said first shaft providing said mounting means and said disks being mounted on the ends of said shaft, a second shaft of lesser length than said first shaft extending through the tubular bearing at the end of said second curved plate, a U-shaped bracket having parallel sides, a second shaft extending through said parallel sides and the tubular bearing on said second plate, a transverse strip, and bolt means extending through said transverse strip and the portion of said bracket extending between its said parallel sides, said strip clamping said bracket to a selected portion of the shank.

10. In combination with a pair of cultivator shanks, a shield unit attached to each of said shanks, each unit comprising a pair of disks, a drawbar, means rotatably mounting said disks at one end of said drawbar, and means at the other end of said drawbar for pivotally attaching said drawbar to a selected portion of the shank with which it is associated, said mounting means of each unit including a tubular bearing affixed to said one end of said drawbar, a shaft journaled in said tubular bearing and a plurality of spacers between said disks and the end of said tubular bearing, the number of tubular spacers determining the lateral distance between said disks so that the lateral spacing of said disks can be selected in accordance with the spacing of said rows of plants, whereby when said shanks traverse parallel paths between adjacent rows of plants, the disks of each unit pass between two rows of plants and along paths to either side of said shanks so that the soil furrowed by the sweep on said shanks is substantially prevented from spreading onto said plants, being instead confined to a region between the disks of each of said shielding units.

11. A shield unit for row crop cultivation comprising a pair of laterally spaced disks, curved arm means, a shaft adjacent one end of said arm means having portions projecting in opposite lateral directions from said arm means, one of said disks being rotatably carried on one of said laterally projecting portions of said shaft and the other of said disks being rotatably carried on the other of said laterally projecting portions of said shaft so as to mount said disks for rotation about an axis perpendicular to said arm means, a tubular bearing at one end of said arm means, said shaft extending through said tubular bearing, means for maintaining said disks in a predetermined laterally spaced relation on said shaft including at least one tubular spacer between each of said disks and said tubular bearing, and a pair of plastic bushings in said tubular bearing, each having a sleeve portion for journaling said shaft and a flange portion bearing against the ends of said tubular bearing.

12. In combination, a shield unit for row crop cultivation comprising a pair of laterally spaced disks, curved arm means, a shaft adjacent one end of said arm means having portions projecting in opposite lateral directions from said arm means, one of said disks being rotatably carried on one of said laterally projecting portions of said shaft and the other of said disks being rotatably carried on the other of said laterally projecting portions of said shaft so as to mount said disks for rotation about an axis perpendicular to said arm means, a cultivator shank having a sweep at its lower end, and means adjacent the other end of said arm means for pivotally attaching the other end of said arm means to said cultivator shank so that the sweep at its lower end resides between said laterally spaced disks, whereby when said sweep is cultivating a strip of soil between two crop rows, said disks travel between said rows and at both sides of the sweep and thus at both sides of the path traversed by said sweep.

* * * * *